US008335488B2

(12) United States Patent
Despain et al.

(10) Patent No.: US 8,335,488 B2
(45) Date of Patent: *Dec. 18, 2012

(54) KEY CONTROL WITH REAL TIME COMMUNICATIONS TO REMOTE LOCATIONS

(75) Inventors: Jay Despain, Salem, OR (US); James Petrizzi, Wilsonville, OR (US); Casey Fale, Portland, OR (US); Jonathan G. Hays, Newberg, OR (US)

(73) Assignee: UTC Fire & Security Americas Corporation, Inc., Bradenton, FL (US)

( * ) Notice: Subject to any disclaimer, the term of this patent is extended or adjusted under 35 U.S.C. 154(b) by 351 days.

This patent is subject to a terminal disclaimer.

(21) Appl. No.: 12/561,434

(22) Filed: Sep. 17, 2009

(65) Prior Publication Data

US 2010/0011418 A1 Jan. 14, 2010

Related U.S. Application Data

(63) Continuation of application No. 10/785,738, filed on Feb. 23, 2004, now Pat. No. 7,606,558.

(60) Provisional application No. 60/449,023, filed on Feb. 21, 2003.

(51) Int. Cl.
*H04M 1/66* (2006.01)
*H04M 11/00* (2006.01)
*B60R 25/00* (2006.01)
(52) U.S. Cl. .. 455/410; 455/41.3; 340/5.73; 379/102.06
(58) Field of Classification Search ................ 455/3.01, 455/3.06, 410, 41.3; 340/5.25, 5.6, 5.73, 340/5.74, 5.8; 379/93.37, 102.06
See application file for complete search history.

(56) References Cited

U.S. PATENT DOCUMENTS

| | | | |
|---|---|---|---|
| 4,838,052 | A | 6/1989 | Williams et al. |
| 5,046,084 | A | 9/1991 | Barrett et al. |
| 5,475,375 | A | 12/1995 | Barrett et al. |
| 5,602,536 | A | 2/1997 | Henderson et al. |
| 5,612,683 | A | 3/1997 | Trempala et al. |
| 5,654,696 | A | 8/1997 | Barrett et al. |
| 5,815,557 | A | 9/1998 | Larson |
| 6,072,402 | A | 6/2000 | Kniffin et al. |
| 6,192,236 | B1 | 2/2001 | Irvin |
| 6,693,538 | B2 | 2/2004 | Maloney |
| 6,727,801 | B1 | 4/2004 | Gervasi et al. |
| 7,009,489 | B2 | 3/2006 | Fisher |
| 7,177,819 | B2 | 2/2007 | Muncaster et al. |
| 2001/0019953 | A1 | 9/2001 | Furukawa et al. |
| 2002/0025804 | A1 | 2/2002 | Hara |
| 2003/0179075 | A1 | 9/2003 | Greenman |
| 2003/0231102 | A1 | 12/2003 | Fisher |
| 2004/0025039 | A1 | 2/2004 | Kuenzi et al. |
| 2004/0049406 | A1 | 3/2004 | Muncaster et al. |
| 2004/0160304 | A1 | 8/2004 | Mosgrove et al. |

OTHER PUBLICATIONS

J. Despain, et al., U.S. Appl. No. 10/785,738, filed Feb. 23, 2004.
P. Myers, et al., U.S. Appl. No. 12/352,940, filed Jan. 13, 2009.

*Primary Examiner* — Quochien B Vuong
(74) *Attorney, Agent, or Firm* — MH2 Technology Law Group

(57) ABSTRACT

A key control system includes at least one premise, a lockbox capable of securing a key to the premise and at least one mobile telephone associated with a user and having a stored access device program capable of communicating an access request to the lockbox. The premise is subject to authorized access by others, such as the user, based on preferences of an approval party established with the system. If specified by these preferences, the mobile telephone automatically initiates a communication to a selected destination to request approval of the access request.

16 Claims, 18 Drawing Sheets

KEY CONTROL WITH REAL TIME COMMUNICATIONS TO REMOTE LOCATIONS

CROSS-REFERENCE TO RELATED APPLICATIONS

This application is a Continuation of and claims benefit under 35 U.S.C. §120 or 121, to prior-filed, U.S. non-provisional patent application Ser. No. 10/785,738, filed on Feb. 23, 2004 now U.S. Pat. No. 7,606,558, which claims the benefit of U.S. Provisional Patent Application No. 60/449,023, filed Feb. 21, 2003, each of which is hereby incorporated by reference in its entirety.

STATEMENT REGARDING FEDERALLY SPONSORED RESEARCH OR DEVELOPMENT

Not Applicable

NAMES OF PARTIES TO A JOINT RESEARCH AGREEMENT

Not Applicable

REFERENCE TO A SEQUENCE LISTING, A TABLE, OR COMPUTER PROGRAM LISTING APPENDIX SUBMITTED ON COMPACT DISC

Not Applicable

BACKGROUND OF THE INVENTION

1. Field of the Invention

This application relates to key control systems and methods, particularly those that include a lockbox located near a premise to which controlled access is to be permitted under specified conditions, and other related security applications.

2. Description of Related Art

A lockbox, sometimes referred to as a "keybox," has a locked compartment within which a key to a conventional lock or other physical access device or asset can be stored. In typical uses, the lockbox is positioned near a premise to which controlled access is desired, e.g., a home or other dwelling, a commercial building or site, or virtually any other type of premise, and a conventional key to open a lock securing the premise is stored within the locked compartment. Lockboxes are widely used by real estate agents to facilitate the showing of listed properties. Lockboxes are also used in commercial and industrial settings to facilitate access to secured premises, particularly when the premises are otherwise unattended, such as in the case of accesses that take place after hours or at many geographically dispersed locations.

The lockboxes of primary interest here have electronically or electrically actuated locks that are capable of receiving unlocking signals transmitted wirelessly. Such lockboxes may have, e.g., a receiver for an infrared, radio or other type of wireless signal. The unlocking signals are sent by access devices, sometimes referred to as keys.

A person recognized as a key control system user can use her access device to transmit a request to access a premise within the system that is secured by a lockbox. In general terms, the system determines whether the user's access request is to be granted, and, if so, enables the user to unlock the lockbox and access its contents. In a typical scenario, the lockbox contains a conventional key to the locked premise and the user uses the key to unlock the premise and gain physical access to it.

The system typically includes tracking capabilities that may record the user's identity, the time of the access request, the premise to which access is requested, etc. The system may also include capabilities to communicate between a central authority and the user to convey information such as updates, messages, commands, etc.

In conventional key control systems, however, establishing substantially real time wireless communications, such a link with a remotely located party, is not feasible, particularly where two-way communications are desired.

BRIEF SUMMARY OF THE INVENTION

According to one implementation, a key control system includes at least one premise subject to authorized access by others based on preferences of an approval party, a lockbox having a locked area capable of securing a key for access to the premise and at least one mobile telephone associated with a user and having a stored access device program capable of communicating an access request to the lockbox. If specified in the preferences established by the approval party, the mobile telephone automatically initiates a communication to a selected destination to request approval of the access request.

The request for approval can be required in addition to determining whether the user is authorized to make the access request, i.e., even a user who is authorized may be denied access if approval is required and is not granted. The request for approval can be required for only selected premises within the system. Unsuccessful attempts to request approval or unanswered requests can be configured to trigger denial of the access request.

The approval party can be any entity with an interest in controlling access to the premise. In the real estate context, the approval party may be, e.g., the listing real estate agent responsible for selling or renting the premise. In other contexts, the approval party could be the owner of the premise or another party with rights or permission to control access to the premise. The approval party's preferences can specify that the destination to receive the automatic communication requesting approval is the approval party or another party designated to receive and respond to these requests. If desired, approval can be required from multiple parties.

The decision on a request for approval may be made in substantially real time at the time of the request, or may have been predetermined in accordance with set preferences of the approval party (i.e., "always grant requests for approval of an access request made by John Smith").

The communications to the selected destination can be in the form of a data communication sent over the mobile telephone's wireless carrier network. The data communication can occur over a separate data service channel of a cellular system (e.g., GPRS or 1×RTT) or over the same channel used for voice communications (e.g., via SMS).

The destination to which the mobile telephone initiates a communication can include a central authority having at least one computer receptive to communications received from the mobile telephone over the mobile telephone's wireless carrier network.

The mobile telephone and the lockbox can be configured such that the access request from the mobile telephone to the lockbox is communicated wirelessly. In specific implementations, the wireless communication from the mobile telephone to the lockbox includes infrared communication, although other forms of wireless communication may be used.

If the access request access is approved, information is communicated via the mobile telephone to complete the approved access. For example, the user can receive an approval code capable of being entered via a keypad on the mobile telephone. As another example, instructions indicating approval of the access request sent to mobile telephone can automatically interact with the access device program stored in the mobile telephone.

According to another implementation, a key control system includes a lockbox having a locked area capable of securing a key for access to a premise, at least one mobile telephone assigned to a user and being programmed with an access device program capable of communicating an access request to the lockbox, and a central authority that administers at least privileges of users to access the lockbox and preferences of an approval party with rights to control access to the premise. The central authority can include one or more computers, including a server, with connections capable of receiving communications from the user via the mobile telephone. In response to an access request by the user via the mobile telephone to unlock the lockbox, the central authority reviews the approval party's preferences associated with the premise. If the central authority determines that the approval party's preferences require approval of the access request, the central authority contacts the responsible party and seeks approval. If the central authority determines that the approval party's preferences do not require approval of the access request, the central authority processes the user's access request in accordance with stored user privileges, and the access request is granted if it is authorized.

In some implementations, if the access request is granted, the central authority communicates information to the user via the mobile telephone. The information communicated to the user via the mobile telephone can include, e.g., a code and/or a voice message. The information communicated via the mobile telephone can include instructions that automatically interact with the program stored in the mobile telephone to make the access request effective.

If the access request is granted, the mobile telephone can be authorized to access the lockbox within a predetermined time period. In other implementations, the mobile telephone can be authorized to access the lockbox exactly one time within the predetermined time period. If the access request is granted, the mobile telephone can be authorized to access at least one other different lockbox. If the access request is granted, the user can be granted access to the lockbox for a predetermined number of times. Of course, these different approaches to continued authorization can also be combined.

The central authority can send termination instructions to the mobile telephone effective to block access to the lockbox via the mobile telephone. The termination instructions supercede any granted access request. The central authority can also administer communications to and from the user regarding operation of the system.

DETAILED DESCRIPTION OF THE INVENTION

Figure 1:
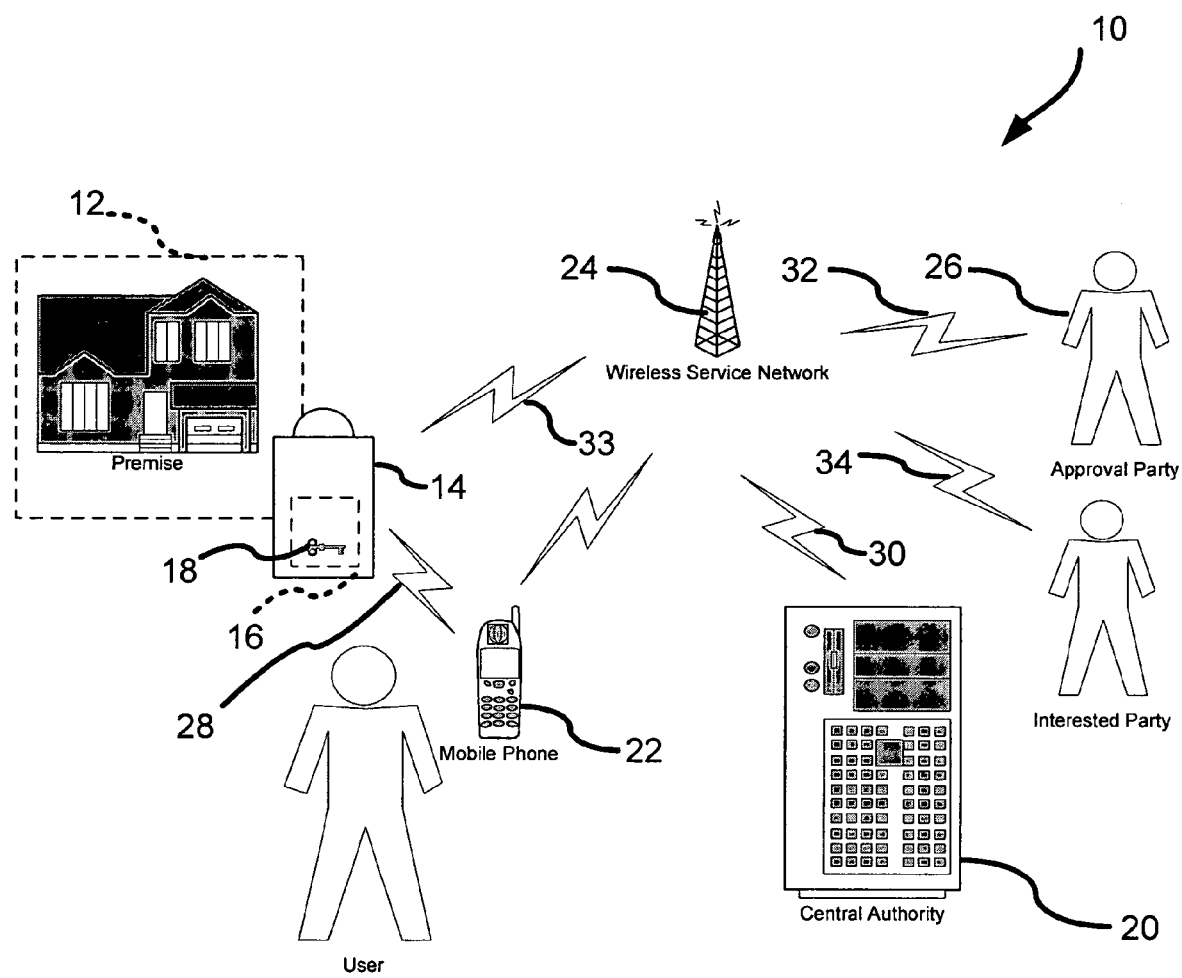
FIG. 1 is a conceptual network diagram showing a first embodiment of a key control system with real time communications features, in which a premise is secured by a lockbox, a user accesses the lockbox with a mobile phone and a central authority administers authorization to access the lockbox and communication to a responsible party.

Described below are implementations of a key control system in which at least one premise is secured by a lockbox securing the key to the premise, there is a least one mobile telephone associated with a user seeking to access the lockbox and programmed with the capability to make an access request to the lockbox, and, if specified, the user's mobile telephone communicates with an approval party, preferably during the access request to the lockbox, to seek approval of the access request. If approval is granted, and assuming the user is otherwise authorized to access the premise, a communication to the mobile telephone or the lockbox allows the access process to continue.

The process of seeking approval occurs without burdensome delays and "substantially in real time." In described, implementations, the process of requesting and receiving approval (or denial) can be completed in 10 seconds or less. Substantial benefits are achieved even if the process takes longer (even 30 seconds or 60 seconds), e.g., due to some equipment or communications traffic.

In the real estate context, some lockboxes may be open to all authorized accesses without constraints, such as, e.g., the time of day for the requested access or who is present to accompany the user during the visit to the premise. For such a lockbox subject to open access, the only requirement is that the user be authorized, e.g., being recognized as user within the key control system and/or having up-to-date credentials for the type of access being requested. Assuming the user is authorized, the user simply makes the access request with his mobile telephone, which typically requires entry of a PIN or other similar code, and the lockbox is unlocked to allow the user to access the key to the premise.

For other lockboxes, however, there may be circumstances in which a lockbox "open to all authorized accesses" does not provide sufficient control, such as, e.g., over who is making the access, when the access is being made or under what circumstances the access is occurring. Although conventional systems provide for logging of access activity, such as the identity of the user, the identification of the access device, the time the access or access attempt was made and other such information (duration of access, purpose of access, actions during access, etc.), such access activity information is generally only available some time after the access is completed. In some systems, interested parties may not learn of an access to a particular premise until the system update, which may occur only at daily intervals.

Within the real estate context, some conventional key control systems provide a "Call Before Showing" (CBS) feature. If a premise is listed with this designation, it is understood that approval from the listing agent was required, i.e., the party requesting access was required to "call" the responsible party (and obtain approval) "before" the premise was "shown" (i.e., before the lockbox was successfully unlocked). This arrangement could be the source of frustrating delays and missed opportunities because the showing agent (or other requesting user) would be required to plan in advance to contact (usually by telephone) the listing agent (or other approval party) before the expected access time, in the hopes of receiving pre-approval. If the approval party could not be reached in time, however, the process of planning for a future access would have to be repeated. In addition, changes in the CBS status of a premise would not be reflected until the next system update, so a need to change a premise from "open to all authorized accesses" to CBS would not be reflected in the same day. If approval was granted, the requested user would have to accurately note and manually input a CBS code.

FIG. 1 illustrates a first embodiment of a key control system 10. The system 10 includes at least one premise 12 that is secured with a lockbox 14 having a locked area 16 in which a key 18 to the premise 12 is stored. As shown, the system 10 also includes a central authority 20 and at least one user, represented by a mobile telephone 22 assigned to the user.

The central authority 20 and the mobile telephone 22 can communicate with each other over a wireless service network 24. An approval party 26 can also communicate with the mobile telephone 22 and/or the central authority 20 over the wireless service network 24. Typically, but not necessarily, the premise 12, the central authority 20 and the approval party 26 are remotely located from each other (there may be circumstances, for instance, in which the approval party is at the premise or is at the central authority).

The central authority 20 administers the access privileges of users and the access preferences of approval parties for premises and lockboxes within the system 10. The central authority 20 includes one or more computers or servers with appropriate communications equipment for communications over at least the wireless service network, and possibly other public and/or private networks. The central authority typically includes a database, which typically includes an identification of each user, her status, the mobile telephone assigned to the user, each premise within the system and its status, and each lockbox within the system and its status, etc. Through communication links, the central authority 20 may optionally provide other services, including informational updates, programming updates, and references.

The mobile telephone 22 is typically a cellular telephone, a satellite telephone or similar portable wireless communications device with at least a voice channel for communicating within or among wireless service networks, such as the wireless service network 24. For example, a device such as a combined personal digital assistant and cellular telephone, although not necessary, could be used. Advantageously, networks that support at least one data channel in addition to the voice channel provide enhanced capabilities. Two such cellular networks, as well as their associated cellular telephone handsets and communications protocols, are referred to as GPRS over GSM and 1xRTT over CDMA. Of course, other similar networks, whether they exist currently or will be developed in the future, can also be used.

GSM and CDMA, as well as TDMA and AMPS, are forms of wireless communication technologies. Each provides a different method of carrying data (or voice) from its source phone or computer to its destination phone or computer. GSM (Global System for Mobile communication) is a digital mobile telephone system that is widely used around the world (especially in Europe). GSM uses a variation of TDMA and is the most widely used of all three digital wireless telephone technologies. GSM digitizes and compresses data, then sends it down a channel with two other streams of user data, each in its own time slot TDMA (Time Division Multiple Access), which is used in GSM, is a technology which divides each cellular channel into three slots in order to increase the amount of data that can be carried on a particular channel at a particular time. In CDMA (Code Division Multiple Access), unlike TDMA and GSM, after the data is digitized, it is spreads out over the entire bandwidth available (unlike GSM and TDMA which place the calls side by side in three streams). Multiple calls are then overlapped on top of each other, and each is assigned a unique sequencing code to "unlock" the information only when and where it should be unlocked. AMPS (Advanced Mobile Phone System) is the original standard for cellular products.

GPRS (General Packet Radio Services) is a packet-based wireless communication service that purports to support data rates from 56 up to 114 Kbps and continuous connection to the Internet for mobile phone and computer users. Among other features, the higher data rates will allow users to take part in video conferences and interact with multimedia Web sites and similar applications using mobile handheld devices as well as notebook computers. GPRS is based on GSM and will complement existing services such circuit-switched cellular phone connections and SMS (Short Message Service). 1xRTT is the abbreviation for single carrier (1.times.) radio transmission technology, a 3G wireless technology based on the CDMA platform. 1xRTT has the capability of providing ISDN-like speeds of up to 144 Kbps. 1xRTT is also referred to as CDMA2000.

SMS allows text messages of up to 160 characters to be sent and received via the network operator's message center to the mobile telephone, or from the Internet using a so-called "SMS gateway" website. If the mobile telephone is powered off or out of range, messages are stored in the network and are delivered at the next opportunity.

The mobile telephone 22 is programmed to function as an access device. In exemplary implementations, the mobile telephone 22 is programmed with an application that allows it to communicate wirelessly with the lockbox 14. For example, the mobile telephone 22 and the lockbox 14 can have transceivers and associated circuitry to enable infrared (IR) or other form of optical communication when within proximity of each other. One suitable infrared communication protocol is the IrDa standard. Various security features, such as requiring PIN code entry upon attempts to make access requests and challenge/response schemes, can be implemented if desired.

If the mobile telephone 22 has a removable memory element, e.g., such as a SIMM card, the access device application may be stored on that element. Alternatively, part or all of the application may be stored in the permanent or dedicated memory of the mobile telephone 22.

Figure 2:
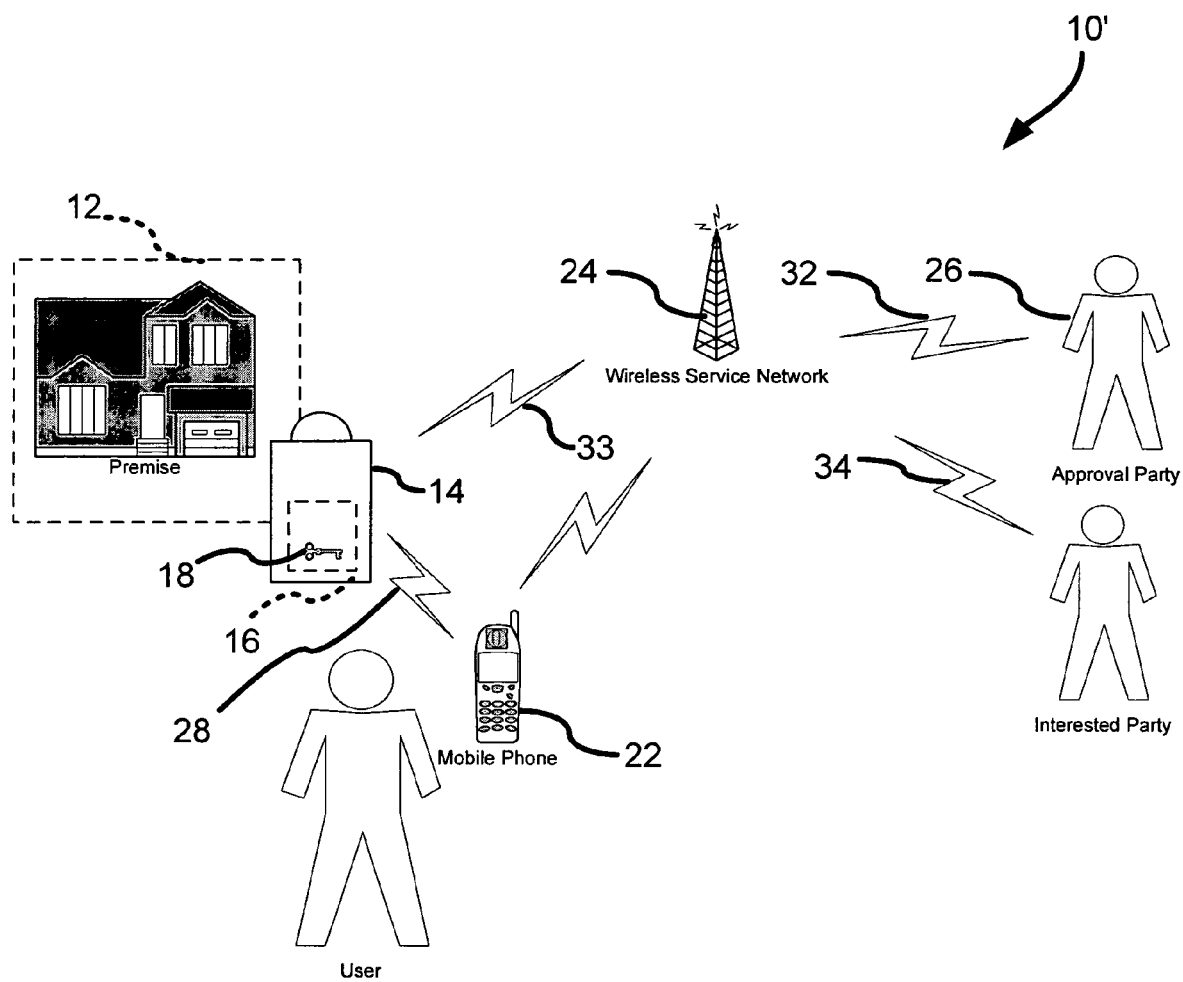
FIG. 2 is a conceptual diagram similar to FIG. 1, except showing a second embodiment of a key control system without a central authority.

Communication established between the mobile telephone 22 and the lockbox 14 is referred to as communication over a "first" communications link 28. There is a "second" communications link representing communications to and from the mobile telephone 22 over the wireless service network 24. In the implementation of FIG. 1, the second communications link is the link 30 between the mobile telephone 22 and the central authority 20 over the wireless service network 24. In the implementation of FIG. 2, the second communications link is the link 32 between the mobile telephone 22 and the approval party 26 over the wireless service network 24.

FIG. 1 shows an optional communications link 34 to indicate that at least one other party, referred to here as an "interested party," may have communications capability within the system. The interested party could be a second approval party or a party seeking to monitor some or all of the access activity at the premise. It should be noted that the communications links 30, 32 and 34 can include communications over the Internet and other types of public and private networks. For example, the mobile telephone 22 communicating over the wireless service network 24 via the communication link 30 to the central authority may effect the communication through connection to a web site operated by the central authority.

Also, there is an optional communications link 33 representing communications to and from the lockbox 14 over the wireless service network 24. If the lockbox 14 is provided with appropriate communications circuitry, the lockbox can 14 can perform some of the communications functions typically performed by the mobile phone 22, or may perform additional communications functions, e.g., to enhance security and/or the access activity information available within the system 10.

Figure 3:
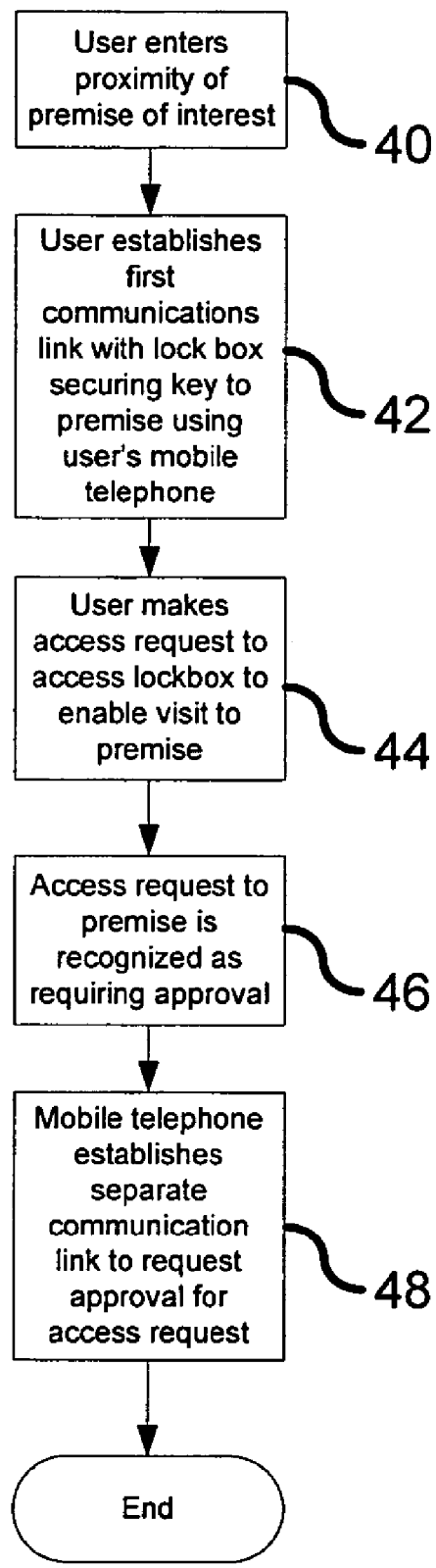
FIG. 3 is a flow chart of a first method showing acts by a user seeking to visit a secured premise.

Referring to the flowchart of FIG. 3, one implementation of a real time access request approval method begins with the user being in proximity of a secured premise within the system 10, such as the premise 12, that she is interested in visiting (step 40). The user locates the lockbox 14 and uses the mobile telephone 22 to establish the first communications link 28 (step 42). According to one implementation, the access device application may provide a menu of options displayed on the mobile telephone's display, such as an option indicating "Obtain Key." By selecting "Obtain Key" and positioning the mobile telephone 22 for communication with the lockbox 14, the user makes her access request to the lockbox 14 (step 44).

Assuming that the user is authorized and no additional approval is recognized, the lockbox 14 responds to the access request by unlocking, thereby allowing the user to obtain the key 18 from the secured area 16 and to visit the premise 12.

If the premise 12 is recognized as requiring additional approval before an access (step 46), however, access is not provided until the mobile telephone establishes a second communications link with an approval party (step 48) and approval is granted. In some implementations, the second communications link is the link 32 from the mobile telephone 22 to the approval party 26. The approval party 26 may specify that it requires a real time communication to grant approval, or it may be set to provide approval in other ways, such as through an automated message over set times pre-approved for accesses.

In other implementations, the second communications link is the link 30 from the mobile telephone 22 to the central authority 20. The approval process may be based on the approval party's preferences for access stored by the central authority 20. The approval party's preferences may require the central authority 20 to establish communication with the approval party 26 at the time of the request for approval of the access request, or the central authority may be able to process the access request according based on preferences granting approval of all requests by certain users or all access requests at certain times of the day.

Figure 4:
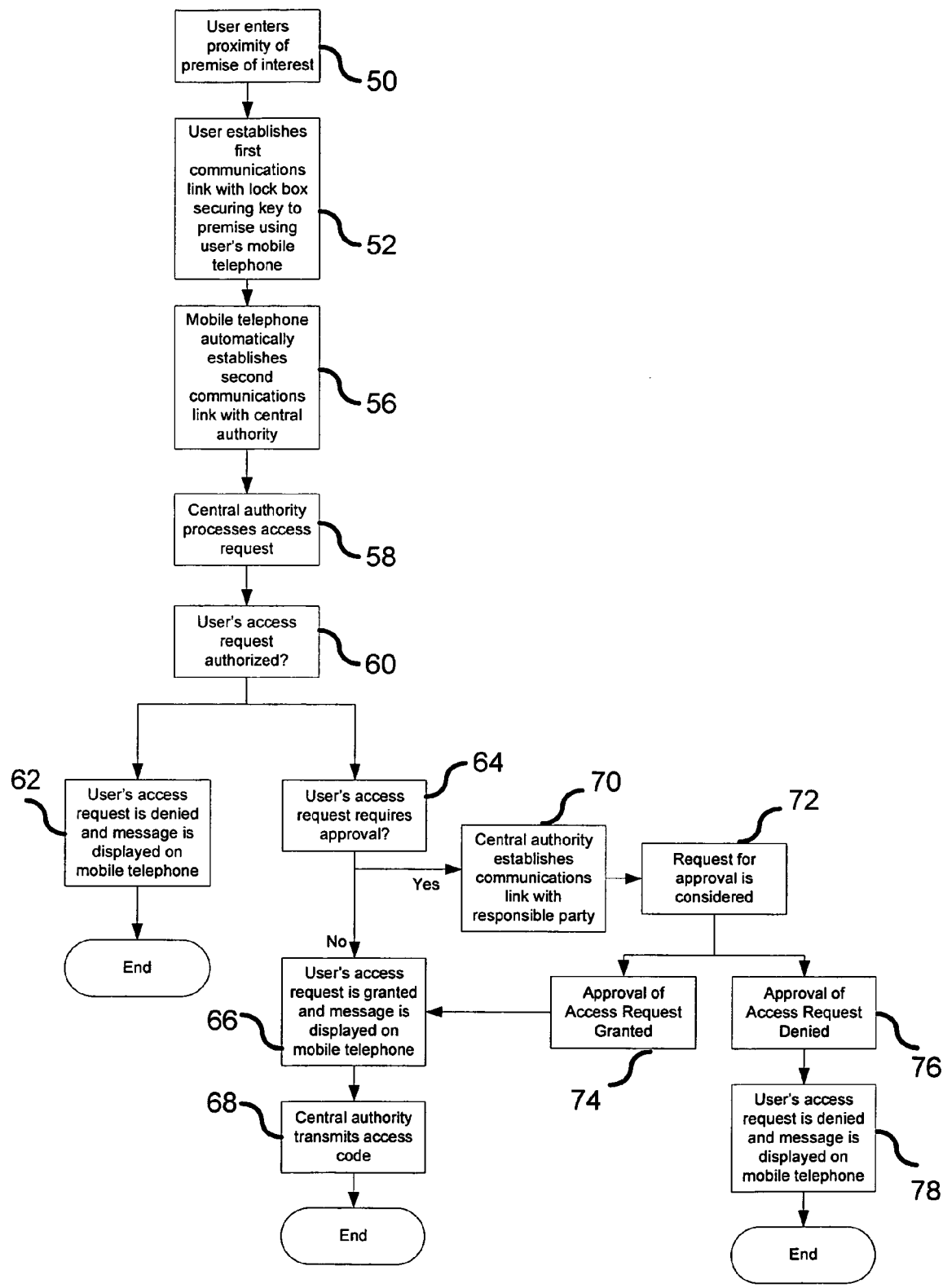
FIG. 4 is another flow chart of a second method showing acts by a user seeking to visit a secured premise.

FIG. 4 is another implementation of an access request method allowing substantially real time approval of an access request. In step 50, the user is in proximity of a secured premise within the system 10, such as the premise 12, that she is interested in visiting. In step 52, the user locates the lockbox 14 and uses the mobile telephone 22 to establish the first communications link 28.

In step 56, the mobile telephone automatically establishes a second communications link with the central authority. This second communications link can be established in the case of all access requests, as in the method illustrated in FIG. 4, or only for selected access requests (based on, e.g., the particular user, the particular lockbox, etc.

Advantageously, the second communications link can be established via a data service channel for data transmission supported by the mobile telephone and the wireless service network 24. Such transmissions offer certain benefits, such as increased communications speed and standardized content, which facilitates subsequent processing.

In step 58, the central authority 20 processes the access request. In step 60, the central authority determines if the user's access request is authorized. For example, the central authority may determine whether the user is recognized within the system 10, whether the user has up-to-date credentials for the access being requested, etc. If the user is not authorized, an optional communication to that effect may be communicated for display on the mobile telephone 22 (step 62), and the process is ended.

If the user is authorized, the central authority 20 determines whether the access request requires approval (step 64). If no approval is required, the access request is granted, which may include an optional communication of a message to that effect for display on the mobile telephone 22 (step 66). In step 68, the central authority then communicates an access code or instruction to the mobile telephone. The access code or instruction may be communicated in any suitable manner, including by a live or recorded voice transmission or by a communication resulting in display of the access code on the mobile telephone 22 for manual entry on a keypad on the mobile telephone 22 or the lockbox 14. The communication in step 68 may also occur as a data transmission directly to the mobile telephone 22, or further, through the telephone 22 and to the lockbox 14 via the first communications link, which expedites the access request process and reduces the chance of human error.

Assuming approval of the access request is required, the central authority 20 attempts to establish communication with the approval party in accordance with the approval party's stored preferences (step 70). The communication may occur in any form, including a telephone call to a predetermined number, a data channel communication delivered to a predetermined number, an e-mail communication, etc.

In step 72, the request for approval of the access request is considered. As in the case of the FIG. 3 methods, the approval party's preferences may require real time communication and approval, or certain accesses may be pre-approved.

If approval of the access request is granted (step 74), the process proceeds to steps 66 and 68. It should be noted that the order of determining a user's general authorization (which occurs first in the illustrated methods) and determining whether the requested access requires separate approval (which occurs subsequently in the illustrated methods), can be reversed.

If approval of the access request is not granted (step 76), access is denied (step 78), and the process is ended. An optional communication to that effect may be communicated for display on the mobile telephone 22.

The above implementations are described as requiring the user to obtain authorization for each access request. Several variations on these implementations are possible. First, the mobile telephone may remain authorized to access the same lockbox or additional lockboxes for a given time period, e.g., eight hours, following authorization. Alternatively, the mobile telephone may remain authorized for a predetermined number of access requests to the same lockbox or multiple lockboxes within the system. Combinations of these variations are also possible.

In addition, the mobile telephone may be preauthorized, e.g., as a result of the periodic updating procedure in which the mobile telephone or a special authorization. Periodic updating procedures include "synching," i.e., establishing communication between the mobile telephone and another entity and updating data stored in each entity that has changed since the last update. During updating procedures in the real estate context, the mobile telephone uploads various information, including the lockbox settings, the mobile telephone authorization information, access activity information, showing feedback information and/or diagnostic information. During the same procedures, the central authority can download key authorization information, access information for specific lockboxes, showing feedback information for specific lockboxes, messages, and/or changes in the system's user roster and/or listing information. If the mobile telephone is preauthorized with respect to the access request being made, the implementations described above need only include determining whether approval of the access request is required.

Using a separate data service channel of the mobile telephone wireless service, if provided, facilitates carrying out updating procedures wirelessly and substantially in real time. In prior systems, such updating procedures were restricted to a specified after-hours time and occurred through a wired connection, via a modem at the user's home or office computer. Thus, if a user misses a periodic updating procedure, the user may be able to initiate an updating procedure at another convenient time while out in the field and within the coverage area of the wireless service network. Advantageously, the mobile telephone can be programmed to automatically establish communication for an updating procedure (1) at a predetermined time, (2) when the mobile telephone is powered ON, and/or (3) when the mobile telephone reenters the coverage area of the wireless service network. In certain circumstances, variations of the above implementations for making an access request can include some or all steps of an updating procedure.

It is also possible to require the user to enter information, e.g., feedback information about a premise, before allowing the access request to be processed further.

Under certain circumstances, it is desirable to have the capability to establish a communications link with the mobile telephone and send termination instructions effective to prevent the mobile telephone from being used to gain access, either permanently or for a predetermined time period. This feature might be used in the case of learning that a user has just lost her privileges or the user's mobile telephone is being used by an imposter who also has her other credentials (e.g., the PIN or other code) allowing use of the mobile telephone as an access device. Use of the real time termination instructions feature would be programmed to supercede any previously granted authorization. Because real time termination instructions can be communicated quickly, i.e., within about the same time window as required for the approval process (about 60 seconds or less, or even about 10 seconds or less), the system's exposure to inadvertently authorized accesses is much lower than in current commercial systems where an imposter could use his key to the system until the next regular update.

Although the above implementations refer primarily to infrared communication between the mobile telephone and lockbox, other types of wireless communication, e.g., RF, Bluetooth, cellular, etc., may be used. Although the above implementations refer to a lockbox, the principles apply equally to any other device having an electronic lock.

Figure 5A:
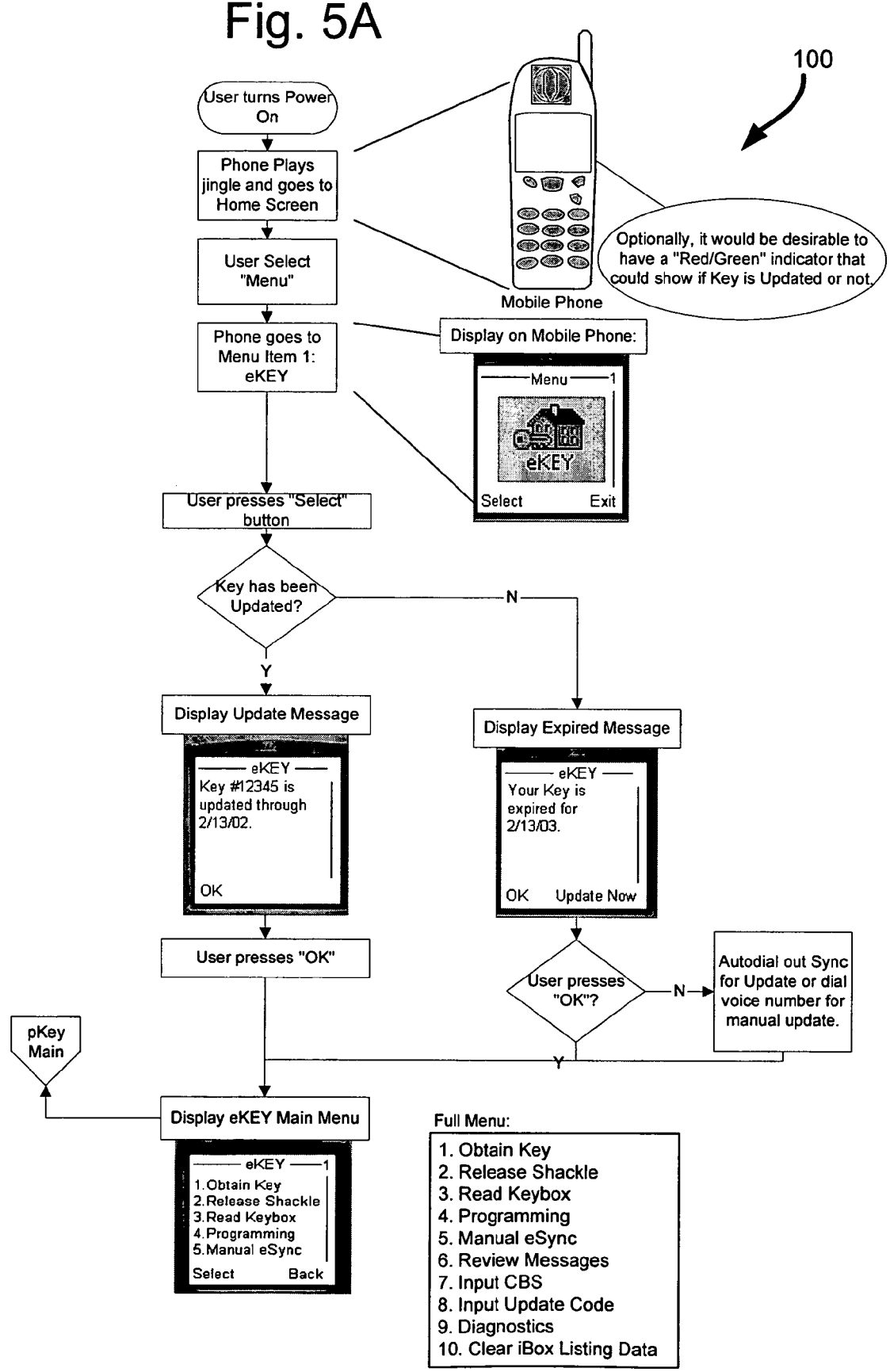
FIGS. 5A to 5N are flow charts showing various aspects of exemplary mobile telephone functions, including screen displays that may be provided to orient the user.
Figure 5B:
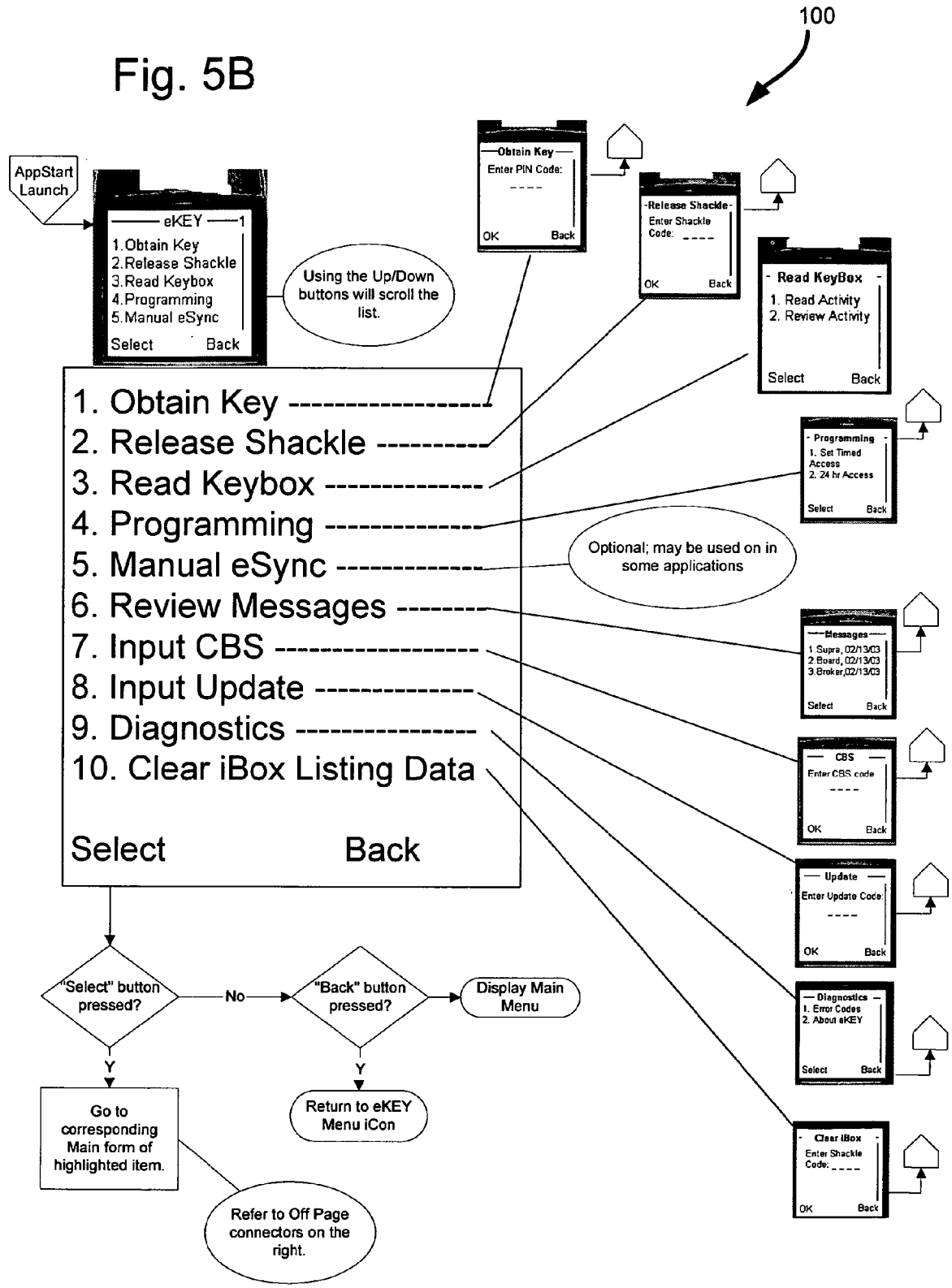
Figure 5C:
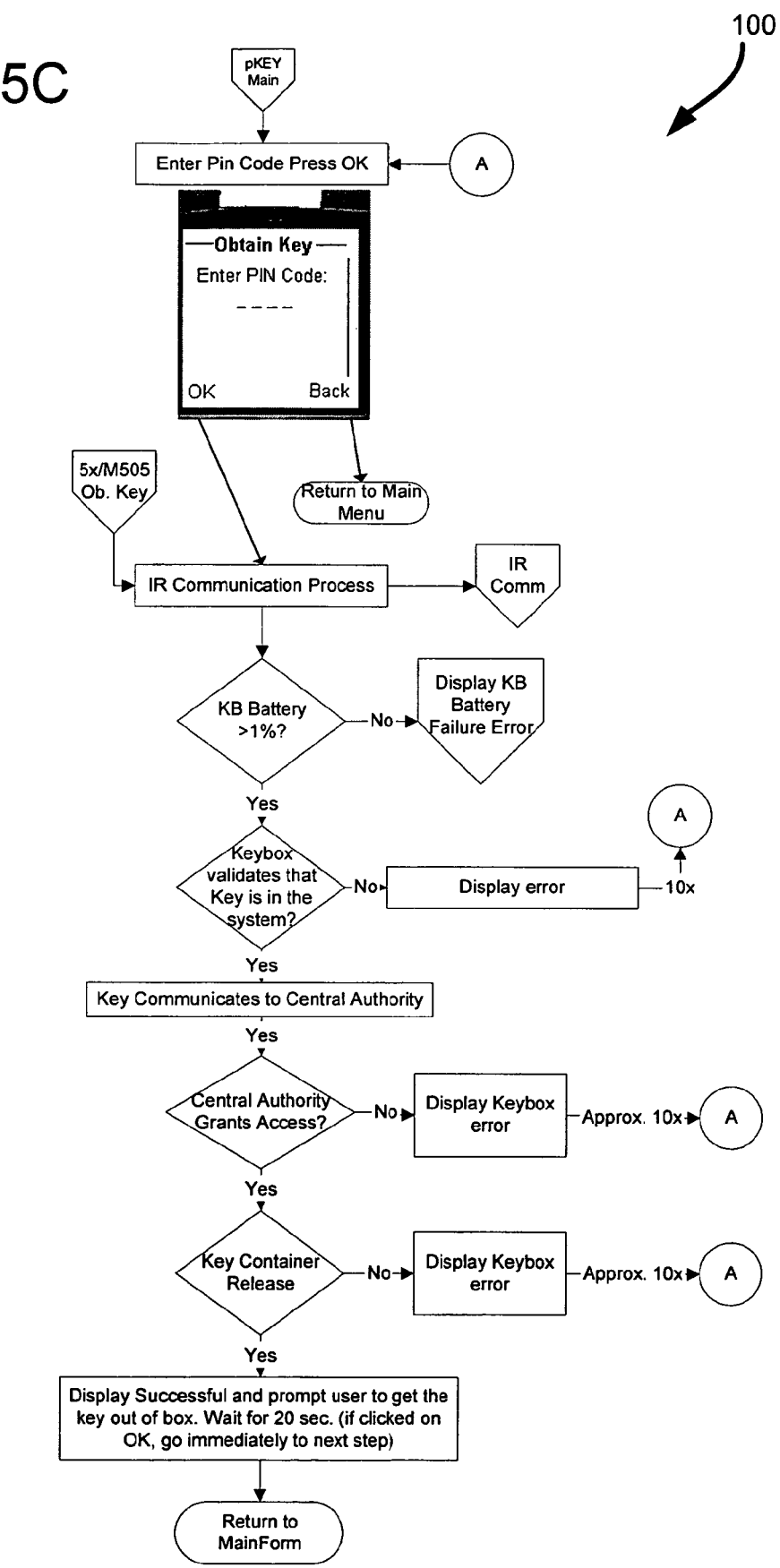
Figure 5D:
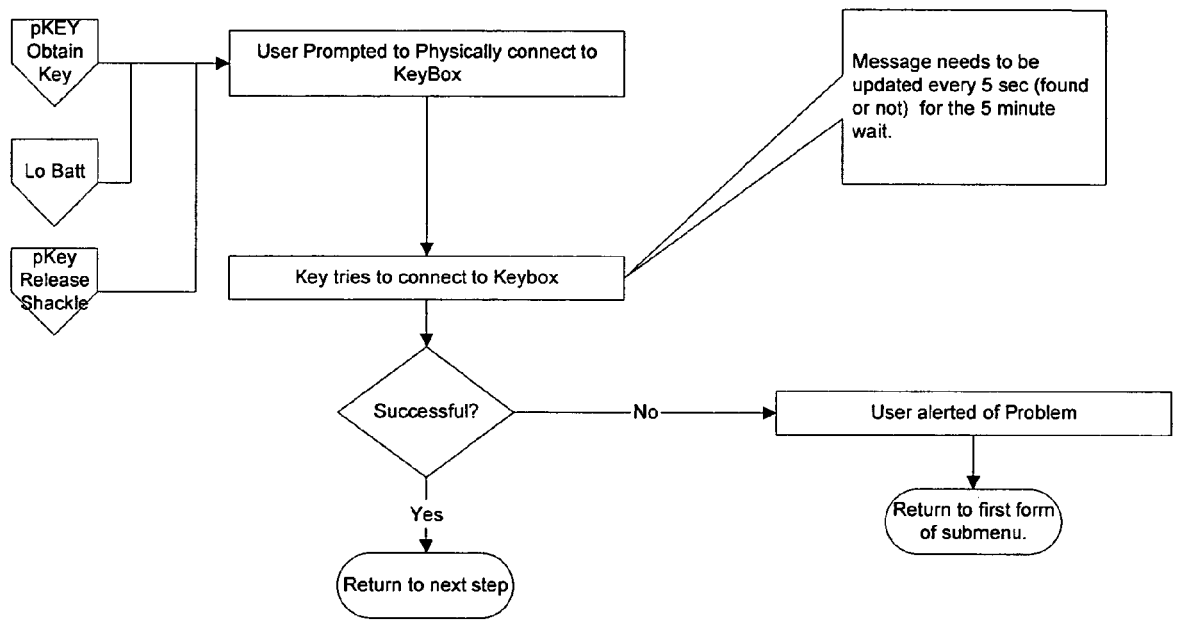
Figure 5E:
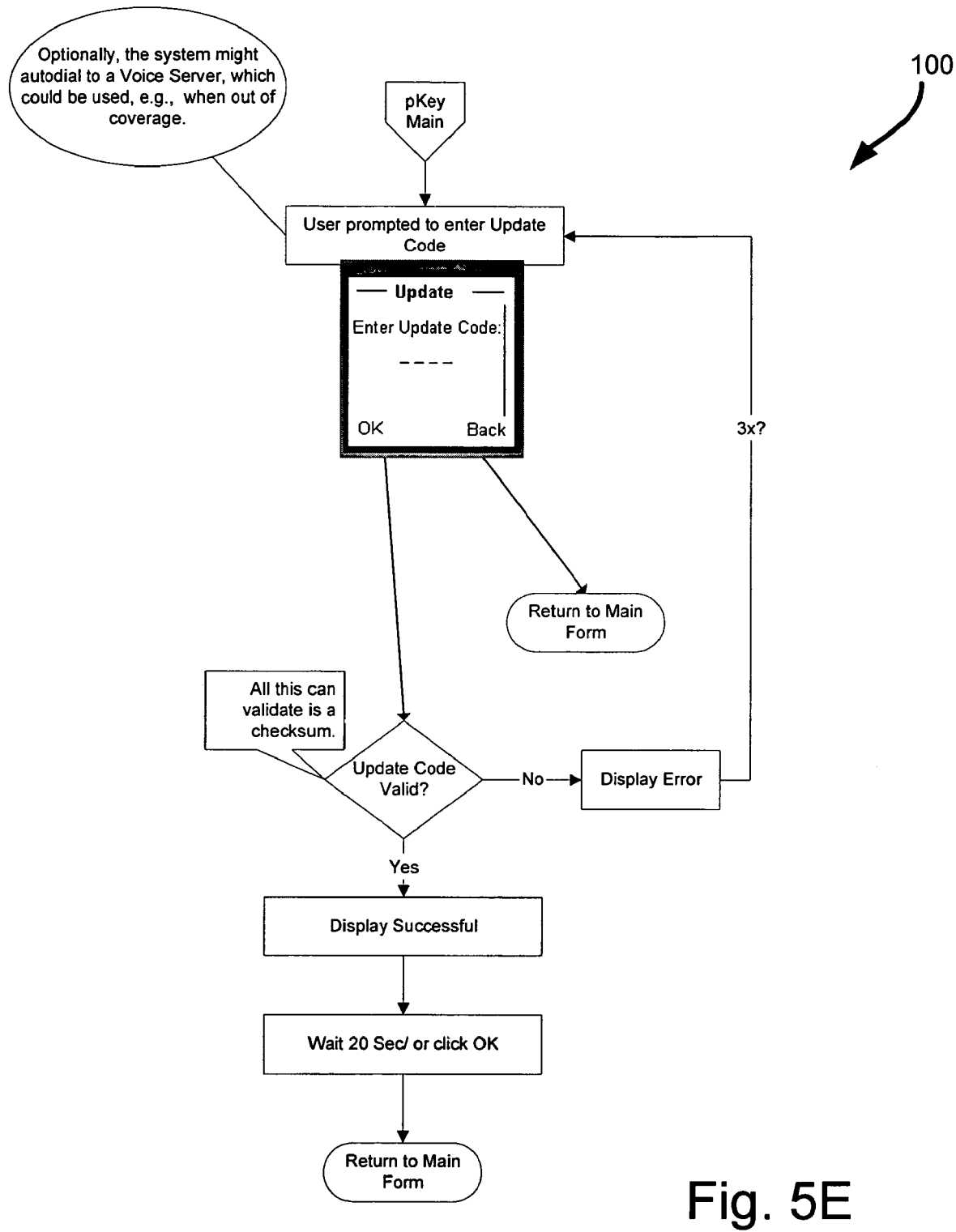
Figure 5F:
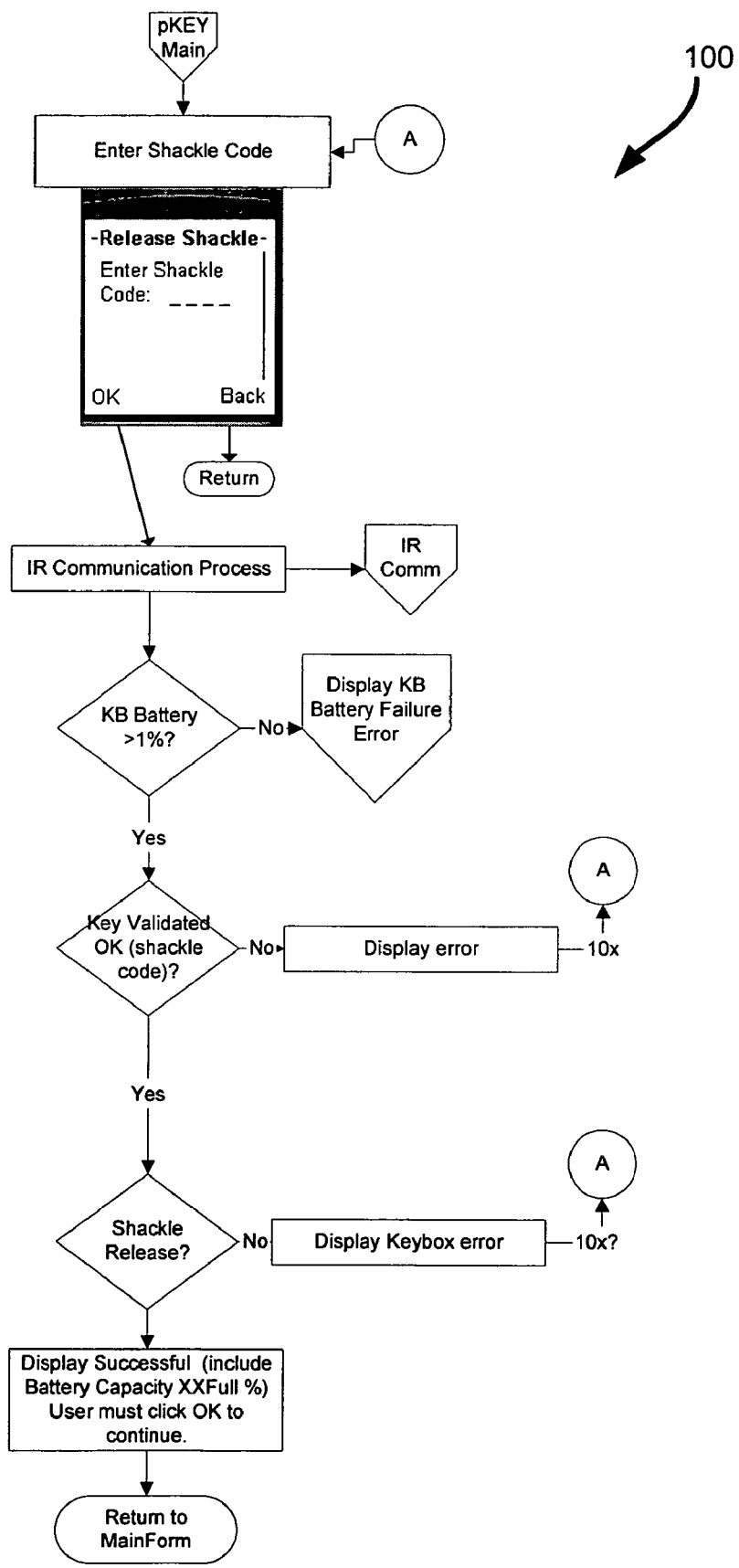
Figure 5G:
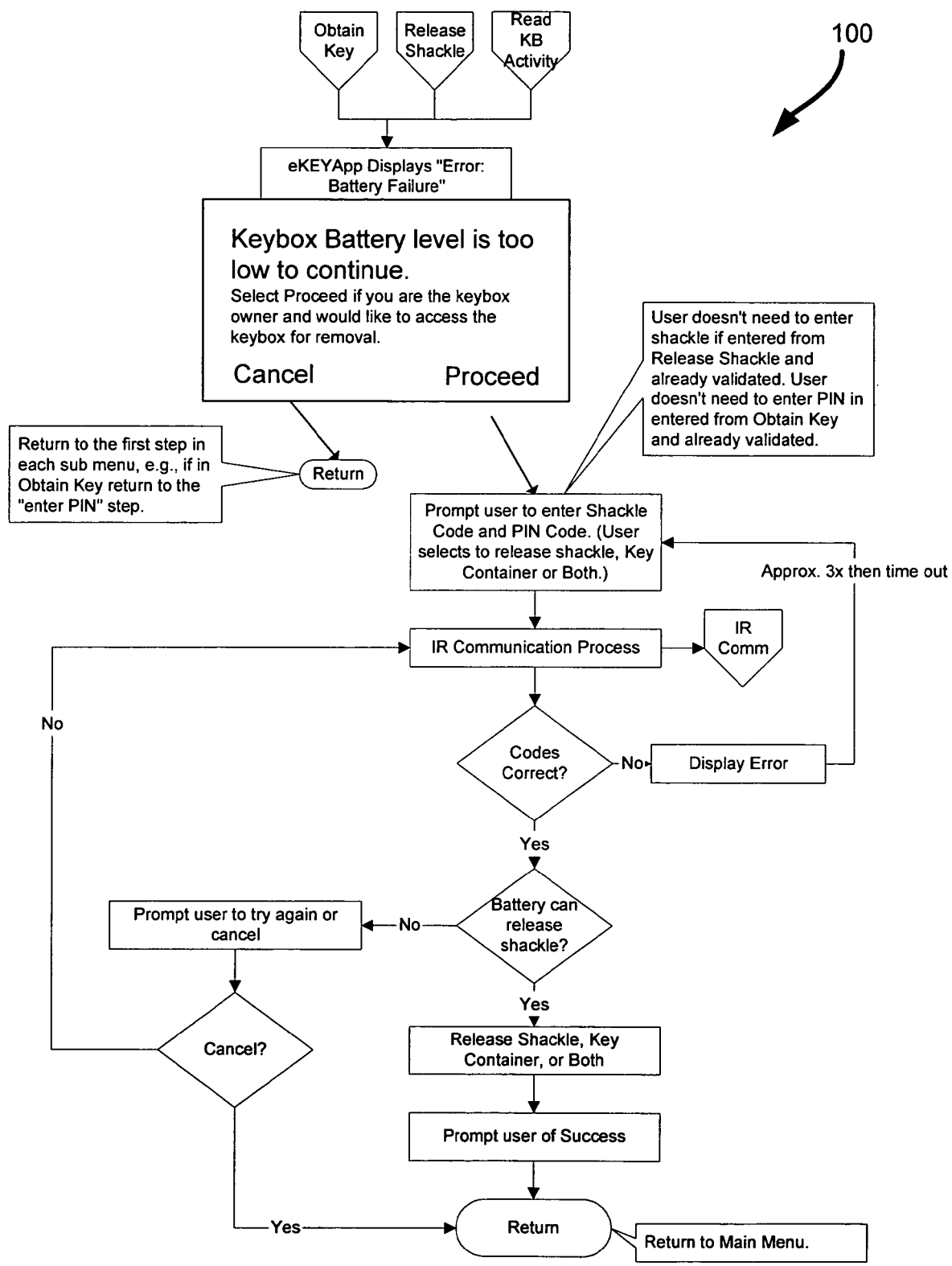
Figure 5H:
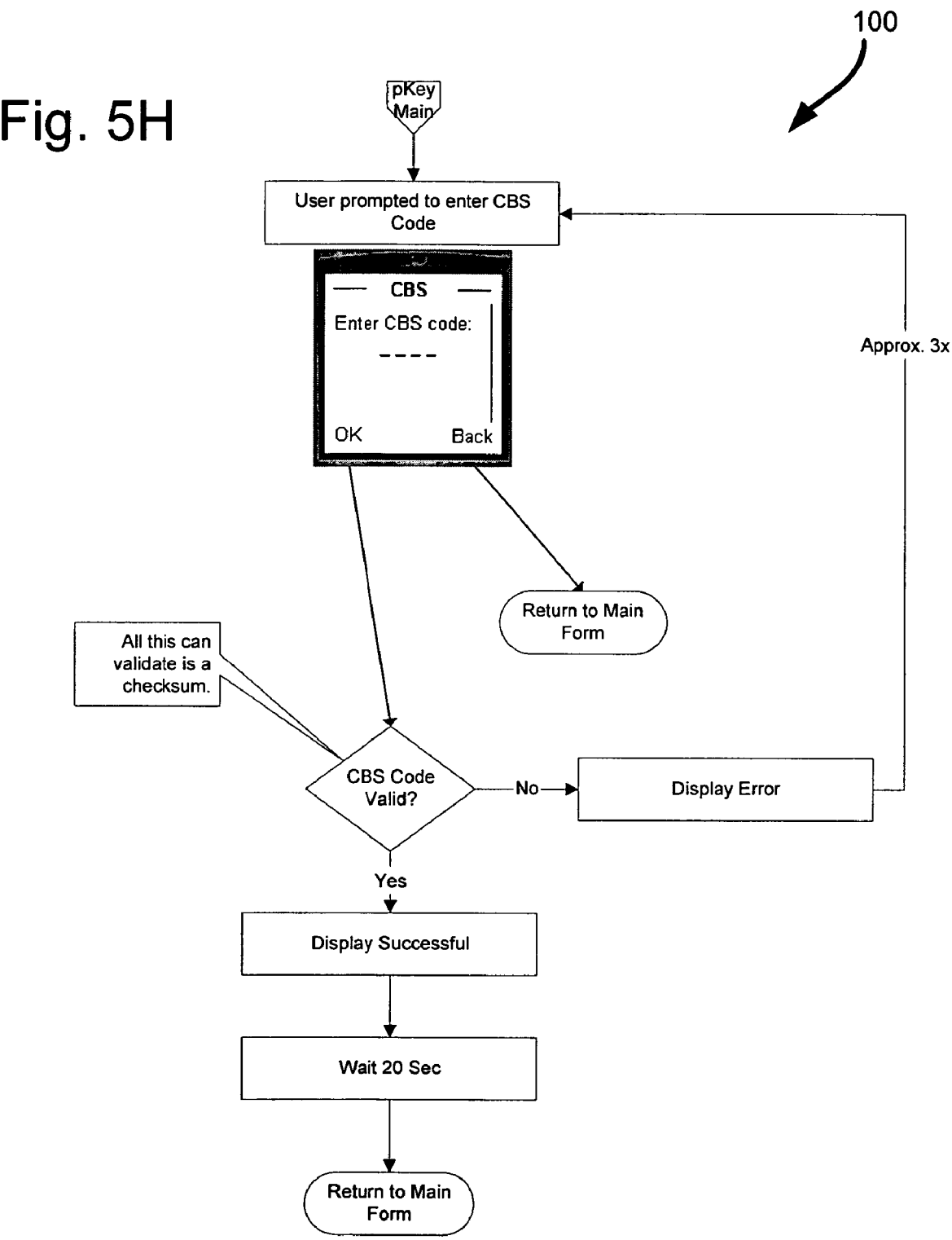
Figure 5I:
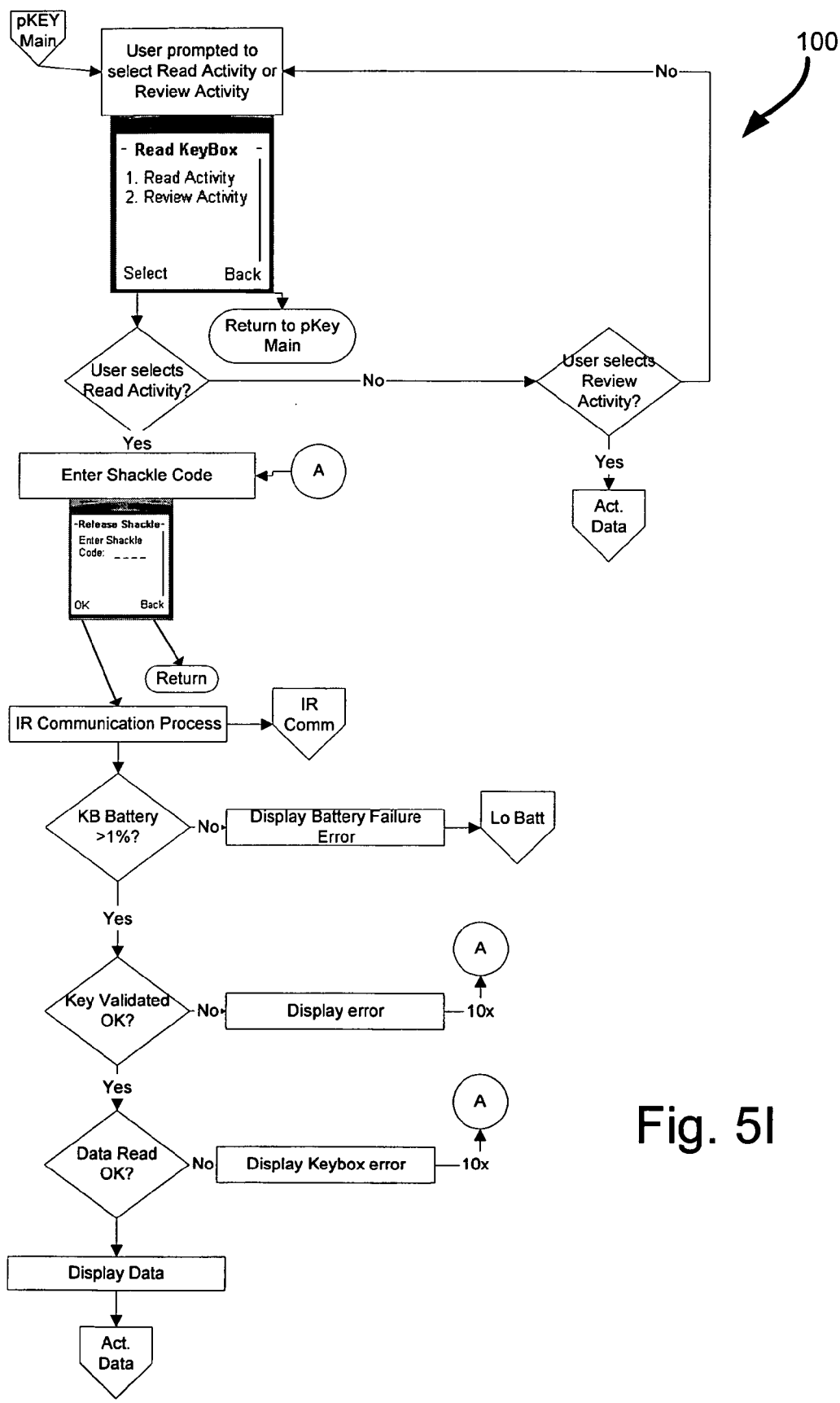
Figure 5J:
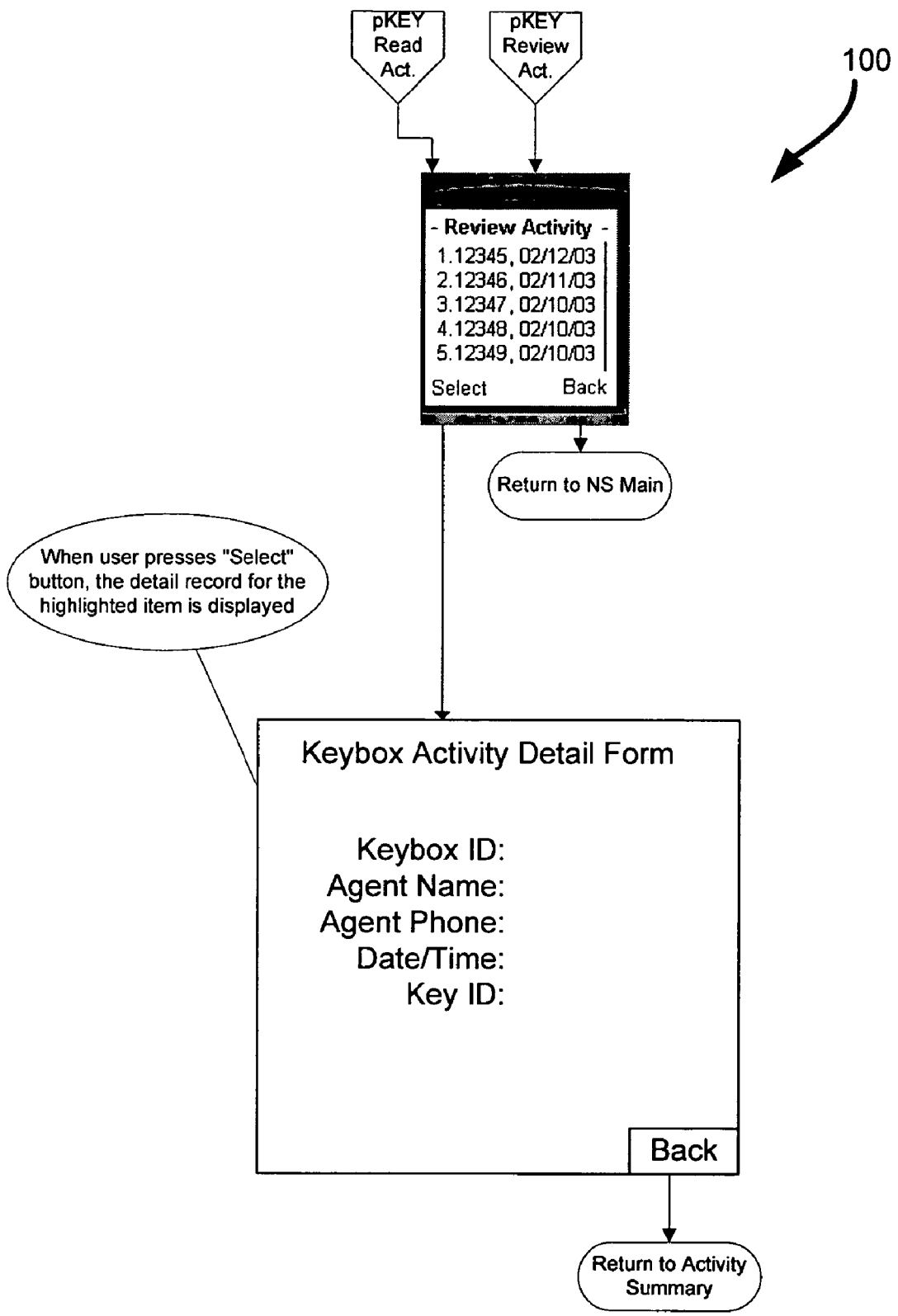
Figure 5K:
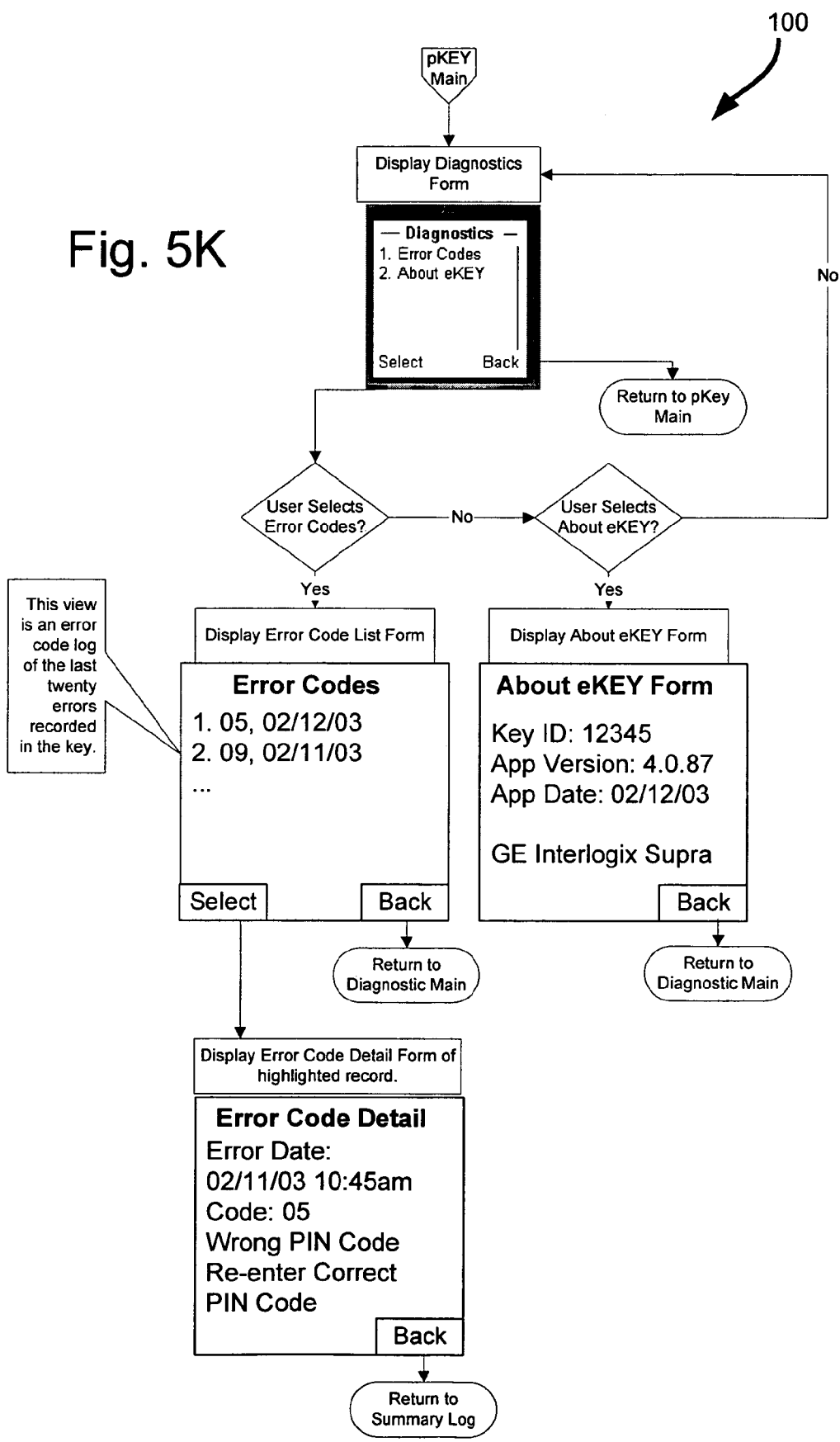
Figure 5L:
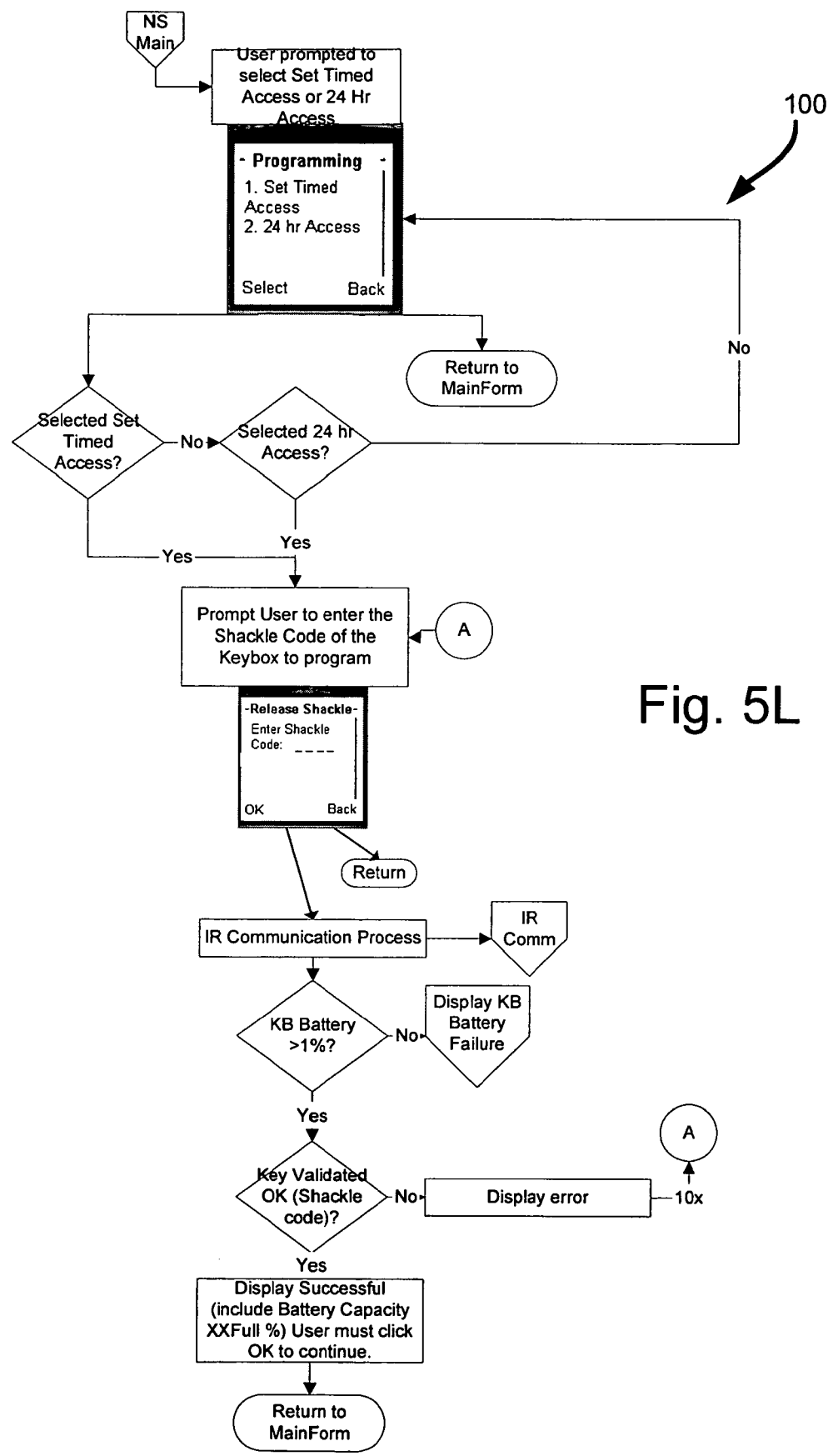
Figure 5M:
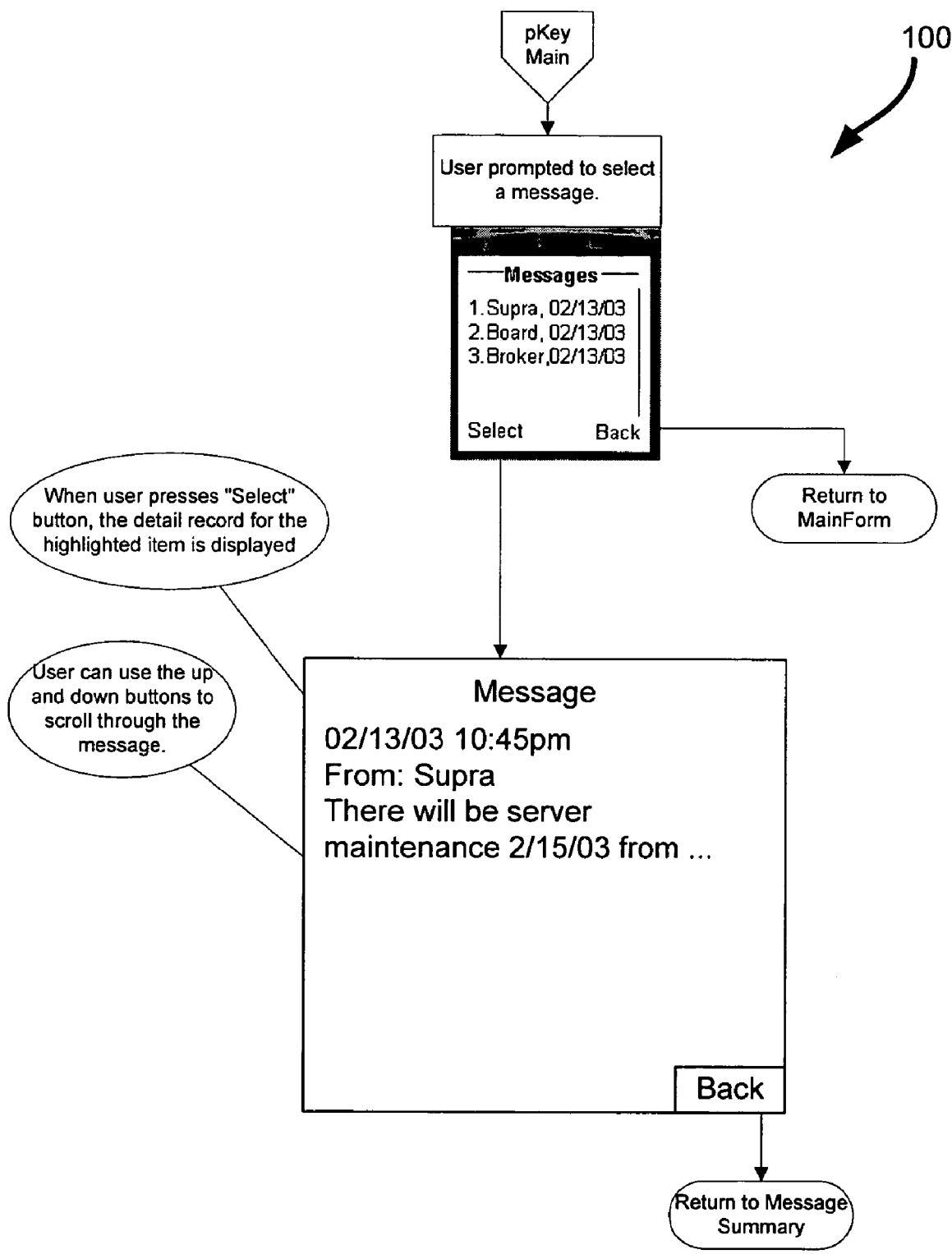
Figure 5N:
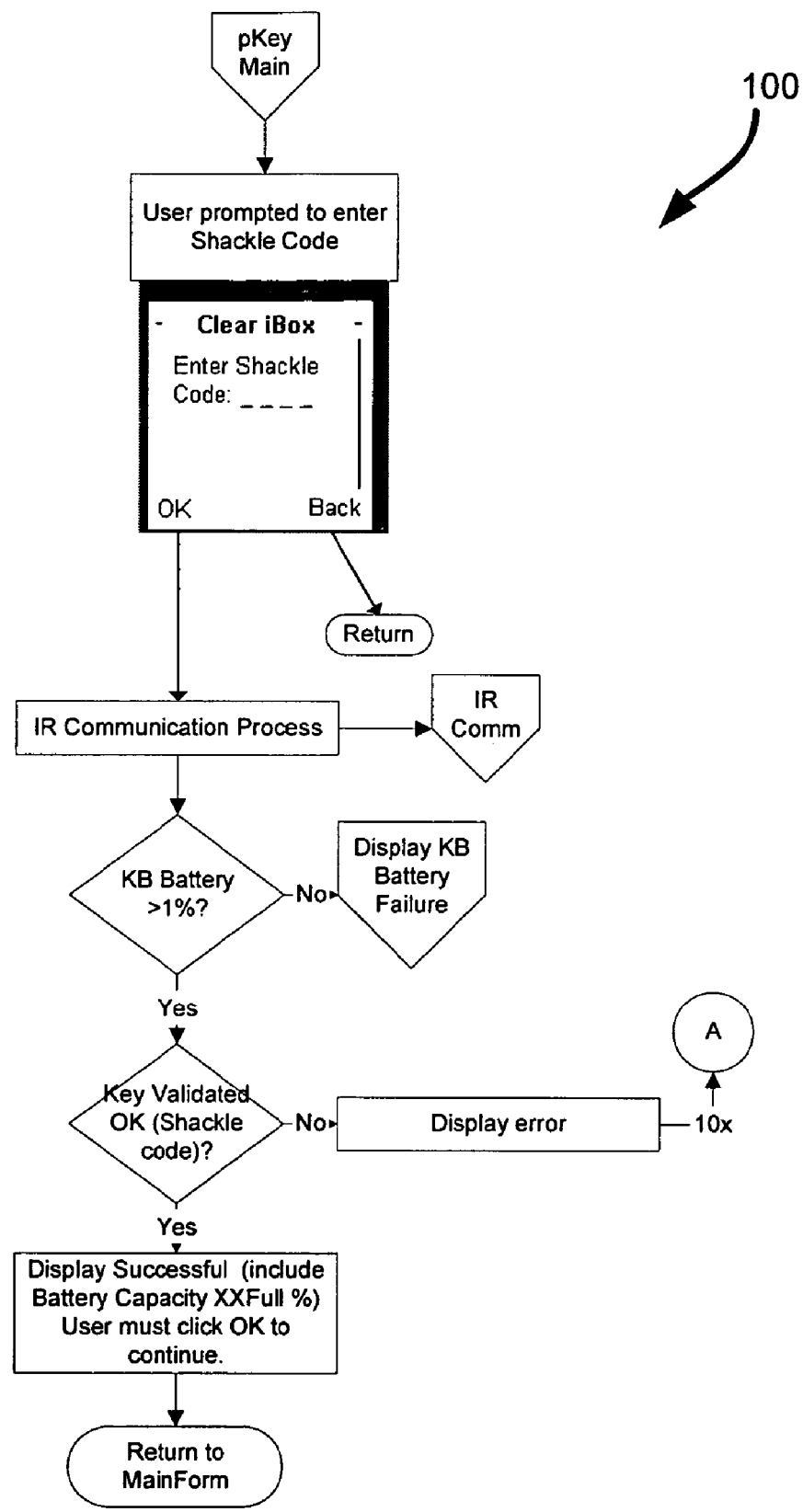

FIGS. 5A to 5N are flow charts showing various aspects of the mobile telephone access device program functions according to one exemplary embodiment. These figures also include representative mobile telephone screen displays that may be provided to orient the user during use of telephone as an access device. In these figures, the mobile telephone is referred to as the "Key," and the lockbox is referred to as the "Keybox." FIGS. 5A to 5N show the following aspects of a program 100: application start and main menu (FIGS. 5A and 5B); obtain key operation (FIG. 5C); IR communication (FIG. 5D); update code operation (FIG. 5E); release shackle operation (FIG. 5F); low battery warning operation (FIG. 5G); call before showing code operation (FIG. 5H); read lockbox activity operation (FIGS. 5I and 5J); diagnostics operation (FIG. 5K); programming operation (FIG. 5L); messages operation (FIG. 5M); and clear lockbox operation (FIG. 5N).

The present invention has been shown in the described embodiments for illustrative purposes only. Further, the terms and expressions which have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A lockbox access apparatus, comprising:
   a wireless communications device having a stored program configured to cause the wireless communications device to communicate an access request to a lockbox and, as a result of communicating the access request to the lockbox, to automatically initiate a communication to a selected destination to request approval of the access request.

2. The lockbox access apparatus of claim 1, wherein the wireless communications device initiates a communication to the selected destination via a data communication sent over the wireless communications device's wireless carrier network.

3. The lockbox access apparatus of claim 1, wherein the selected destination to which the wireless communications device initiates the communication includes a central authority having a computer receptive to communications from the wireless communications device over the wireless communications device's wireless carrier network.

4. The lockbox access apparatus of claim 1, wherein the wireless communications device and the lockbox are configured such that the access request is communicated wirelessly.

5. The lockbox access apparatus of claim 4, wherein the wireless communication includes infrared communication.

6. The lockbox access apparatus of claim 1, wherein the wireless communications device is further configured to receive information from the selected destination if the access request is approved.

7. The lockbox access apparatus of claim 6, wherein the wireless communications device is further configured to communicate the received information to a user of the wireless communications device to complete the approved access.

8. The lockbox access apparatus of claim 6, wherein the wireless communications device further comprises:
   a keypad, and
   wherein the received information comprises an approval code capable of being, entered via the keypad on the wireless communications device.

9. The lockbox access apparatus of claim 6, wherein the received information includes an approval code configured to authorize access to the lockbox within a predetermined time period.

10. The lockbox access apparatus of claim 9, wherein the approval code is configured to expire at an end of the predetermined time period.

11. The lockbox access apparatus of claim 6, wherein the received, information includes an approval code configured to authorize access to the lockbox exactly once within a predetermined time period.

12. The lockbox access apparatus of claim 6, wherein the received information includes an approval code configured to authorize access to the lockbox for a predetermined number of times.

13. The lockbox access apparatus of claim 6, wherein the lockbox comprises a first lockbox and at least a second lockbox, and wherein the received information includes an approval code configured to authorize access to both the first lockbox and at least the second lockbox.

14. The lockbox access, apparatus of claim 6, wherein the received information comprises termination instructions configured to block access to the lockbox.

15. The lockbox access apparatus of claim 14, wherein the termination instructions are further configured to supercede an approval code.

16. One or more computer-readable media comprising instructions configured to cause a computer to perform a locking mechanism access method, the method comprising:
- receiving, at a server, a communication from a remote wireless communications device, wherein the communication relates, at least in part, to information that the remote wireless communications device has sent an access request to a lockbox locking mechanism; and
- sending, by the server, approval for the access request to the remote wireless communications device based, at least in part, on the communication.

* * * * *